United States Patent [19]

Deedreek

[11] Patent Number: 4,558,930

[45] Date of Patent: Dec. 17, 1985

[54] TRUCK MIRROR ADJUSTABLE IN THE HORIZONTAL DIRECTION

[76] Inventor: Harold Deedreek, 5741 SW 37 Ct., Davie, Fla. 33314

[21] Appl. No.: 596,820

[22] Filed: Apr. 4, 1984

[51] Int. Cl.$^4$ ............................. G02B 7/18; G02B 5/08
[52] U.S. Cl. ..................................... 350/604; 350/637; 350/639; 248/480
[58] Field of Search ............... 350/604, 637, 633, 605, 350/632; 248/480

[56] References Cited

U.S. PATENT DOCUMENTS

| | | | |
|---|---|---|---|
| 2,241,866 | 5/1941 | Needham | 350/604 |
| 3,005,384 | 10/1961 | Baird et al. | 350/637 |
| 3,390,937 | 7/1968 | Nicholson | 350/637 |
| 3,634,002 | 1/1972 | Vollrath | 350/633 |
| 3,825,324 | 7/1974 | Brewington | 350/637 |
| 3,937,563 | 2/1976 | Frabe | 350/604 |

Primary Examiner—Jon W. Henry
Attorney, Agent, or Firm—Eugene F. Malin

[57] ABSTRACT

There is disclosed herein an adjustable mirror for use with a vehicle such as a semi-trailer truck. The mirror can be adjustable by being rotated or by being moved horizontally inward or outward from the truck. The control mechanism to move the mirror is reversible motors which can be controlled from within the truck through the use of a pair of switches. The mechanism for moving the mirror inward or outward includes a rack and pinion which is controlled by the motor means.

7 Claims, 3 Drawing Figures

TRUCK MIRROR ADJUSTABLE IN THE HORIZONTAL DIRECTION

This invention relates to an adjustable truck mirror and more particularly to a mirror which can be both rotatably adjusted and positionably adjusted away from or towards the truck.

Truck mirrors are well-known in the prior art and are typically positioned on the side of the truck slightly ahead of the position in which the driver sits. The mirrors can be rotatably adjusted to give the driver a view of the rear surroundings on the side of and to the back of the truck. The mirror can be rotated to change the view given a driver so that he may view more along the side of the truck or more towards the back of the truck. Means are also known for adjusting the rotational position of the mirror from within the cab. Such means are typically mechanical in nature and are operated by adjusting a lever which in turn controls gears or cables to rotate the mirror. An examle of such a controlled mirror is shown in U.S. Pat. No. 3,245,283 to A. J. Van Noord. Electric motor means are also known in the prior art to rotationally adjust the mirror, such as is shown in U.S. Pat. No. 4,145,023 to Lakey.

It is also known in the prior art that the mirror can be adjusted positionally towards or away from the truck to change the angle of the view offered the driver. This is particularly useful when the mirror is used with a semi-trailer truck and the truck is being backed into a space such that by the tractor and the trailer are at different angles with respect to one another.

U.S. Pat. No. 3,390,937 to Nicholson discloses a mirror mechanism which allows the mirrors to be positionally relocated towards or away from the truck. However, the mechanism in the Nicholson patent is quite expensive and cumbersom. Briefly, the Nicholson mechanism includes means sitting on top of the cab with two arms extending to both sides of the truck. The mirrors are coupled to the ends of the arm and the arms can be moved inward or outward through the use of a worm gear therein. The Nicholson disclosure also teaches the use of an electrical motor to rotate the mirror. A problem with the Nicholson invention is that the mirrors themselves are only not securely positioned at the end of arms, since only the top of the mirror is secured to the arm.

In accordance with on aspect of this invention there is provided an adjustable mirror for use in a vehicle comprising a U-shaped frame and means for pivotally attaching the mirror to the frame including motor means for controllably rotating the mirror. The adjustable mirror also comprises means for attaching the frame to the vehicle side so that the mirror is approximately perpendicular to the ground and means for controlling the motor.

In accordance with another aspect of this invention there is provided a side mirror for a vehicle which is controllably adjustably inward and outward from the vehicle comprising a mirror affixed to an upper a and lower horizontal member, and a pair of tubes affixed to the vehicle, the tube is being positioned in size so that the horizontal members slide therein. In addition, there is provided means, including a rack and pinion, for moving the upper and lower horizontal member slideably within said tubes and motor means for controllably driving the pinions in one of two directions. Finally, there is control means for controlling the motor means to drive the pinions and the direction in which the pinions are driven.

One preferred embodiment of the present invention is hereafter described with specific reference being made to the following figures, in which.

Figure 1:
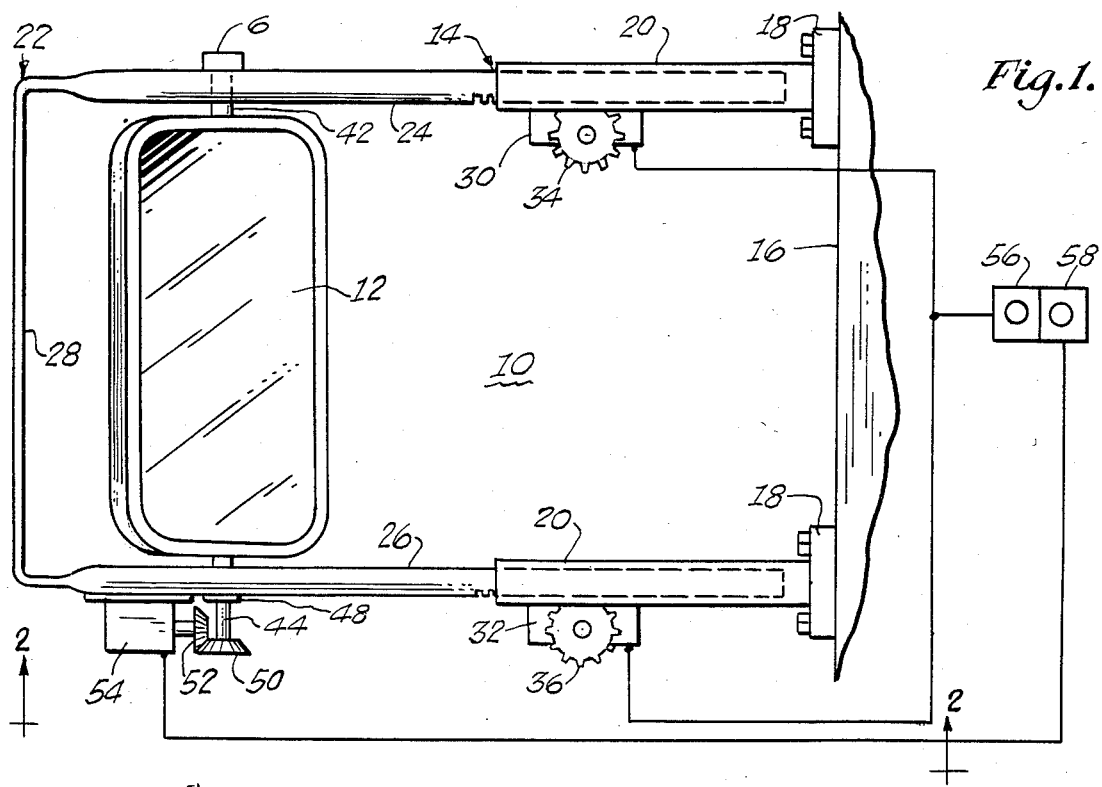
FIG. 1 shows the mirror assembly of the present invention.

Referring now to FIG. 1, the mirror assembly 10 is shown and consists of a mirror 12 and a frame assembly 14. Frame assembly 14 may be secured to the sides 16 of a truck by fastener means 18 in a known manner. The frame assembly 14 includes a pair of hollow tubes 20 each directly connected to fasteners 18. Frame assembly 14 also includes a U-shaped frame 22 consisting of an upper horizontal member 24, lower horizontal member 26 and vertical member 28. Mirror 12 is pivotally connected to upper and lower horizontal members 24 and 26.

Upper and lower horizontal members 24 and 26 are sized so that they may slide easily within the tubes 20. With this sizing, mirror 12 may be moved inward or outward towards or away from the truck as desired. The mechanism to accomplish this includes motors 30 and 32 each having a shaft connected to a gear or pinion 34 and 36. The motors 30 and 32 may be coupled to the hollow tubes 20 by welding or other known means of securing. Also a plate may be fastened to tubes 20 and the motor secured to the plate.

Figure 2:
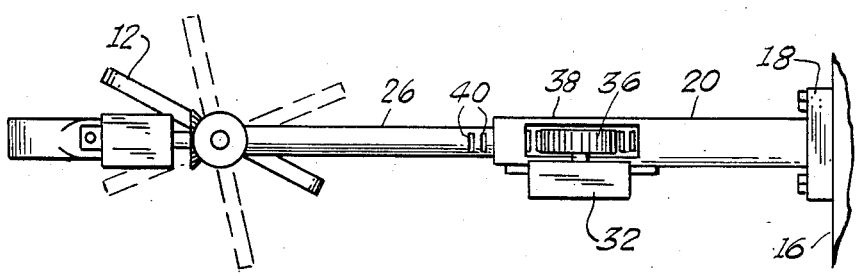
FIG. 2 shows a view looking from the bottom of FIG. 1.
Figure 3:
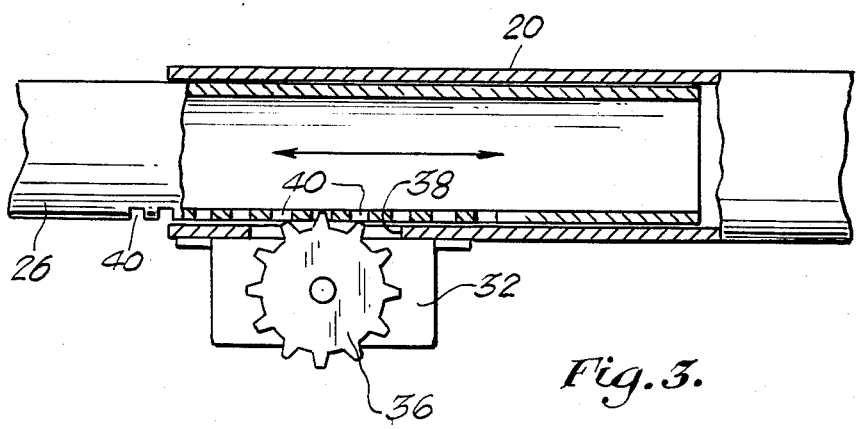
FIG. 3 shows a detail of the mechanism to move the mirror inward and outward.

Referring now to FIGS. 2 and 3, the apparatus for moving mirror 12 inward or outward is shown. In FIG. 2, only the lower horizontal member 26 and associated other elements is shown and described, it being understood that the upper horizontal member 24 is identical.

Tube 20 includes an opening 38 designed so that pinion 36 may be positioned therein. Horizontal member 26 of U-shaped frame 22 has a series of openings 40 therein which may be in the form of grooves or holes. The teeth of pinion 36 and the spacing between the grooves 40 are equal so that as pinion 36 rotates, the teeth thereof engage the grooves 40 and move lower horizontal member 26 inward or outward depending on the direction of rotation. Constructed in this manner, pinion 36 and member 26 act as a rack and pinion.

Referring again to FIG. 1, the rack and pinion action of gear 36 and member 26 is identical with respect to upper member 24 and gear 34. The two motors 30 and 32 driving the pinions 34 and 36 must operate synchronously together so that both member 24 and 26 slide in and out of their respective members 20 at the same velocity otherwise the members 24 and 26 can become jammed in the tube 20. Further both motors 30 and 32 must be capable of rotating the pinions 34 and 36 in two directions as well as being capable of maintaining pinions 34 and 36 breaked.

Mirror 12 is pivotally connected to upper and lower members 24 and 26 through holes therein. Posts 42 and 44 are connected to mirror 12 and extend through the holes in members 24 and 26 and are secured by fasteners 46 and 48. Post 44 is connected to a gear 50 which is driven by second gear 52 connected to the shaft of motor 54. Motor 54 is capable of turning in two directions as well as remaining breaked. As motor 54 turns gear 52, it turns gear 50 causing mirror 12 to rotate. As seen in FIG. 2, mirror 12 can assume any position around a 360° circle. Motor 54 is coupled to lower horizontal member 26 by being welded thereto or affixed to a plate which may be welded or fastened by bolts or the like to member 26. It is also possible that the shaft of motor 54 can be directly connected to mirror 12 and gears 50 and 52 eliminated.

Inside the cab of the truck are a pair of switches 56 and 58. Each of switches 56 and 58 may be of the double-pole double-throw type. For example they may consist of a lever extending from the switch which can be pushed in the upward or downward direction and which by spring action returns to the neutral or center position when not held either upward or downward. Switch 56 is coupled to apply power to each of motors 30 and 32. The coupling is such that when switch 56 is pushed in the upward direction, motors 30 and 32 rotate in one direction and when the level of switch 56 is held in the lower or downward position, motors 30 and 32 rotate in the opposite direction. When the lever of switch 56 is in the center or neutral position motors 30 and 32 act as a break on pinions 34 and 36. Similarly, switch 58 will rotate motor 54 in one direction when the switch is held in the upper position and in the opposite direction when the switch arm is held in the lower position. By positioning switches 56 and 58 in the cab, the driver of the truck has easy access to either rotate mirror 12 or to move mirror 12 inward or outward from the truck. In this manner the driver of the truck can change the angle view given by mirror 12 as the alignment of the cab and trailer differ from a straight line alignment.

In an alternate embodiment not shown herein it would be possible to connect a rod between upper and lower horizontal member 24 and 26. Extending outward toward the truck from that rod would be a similar member to the members 24 and 26 which would move into and out of a member such as tube 20. A single motor such as 32 or 34 having a pinion such as 34 or 36 would then move that rod inward and outward causing the upper and lower members to be moved as shown. Other alterations to the invention as shown, of course, would include providing shielding from the wind for all of the motors as well as providing the upper and lower members 24 and 26 with a nylon sleeve containing the grooves 40 so that it may slide easily within tubes 20.

What is claimed is:

1. A side mirror for a vehicle which is controllably adjustable inward or outward from said vehicle comprising:
   a mirror affixed to an upper and lower horizontal member,
   a pair of tubes affixed to said vehicle and positioned and sized so that said horiontal members slide therein,
   means including a rack and pinion, for moving said upper and lower horizontal members slideably within said tubes,
   motor means for controllably driving said pinions in one of two directions; and
   control means for controlling said motor means to drive said pinions and the direction in which said pinions are driven.

2. The invention according to claim 1 wherein said upper and lower members each have grooves therein forming racks and each of said tubes have an opening therein through which one of a pair of pinions engages the rack of one of said members.

3. The invention according to claim 2 wherein said motor means includes a pair of motors synchronized with respect to one another to rotate said pinions.

4. The invention according to claim 2 further comprising means attached to one of said members for rotating said mirror.

5. The invention according to claim 4 wherein said means for rotating includes reversible motor means and motor control means for controlling said motor means.

6. The invention according to claim 1 further comprising means attached to one of said members for rotating said mirror.

7. The invention according to claim 6 wherein said means for rotating includes reversible motor means and motor control means for controlling said motor means.

* * * * *

UNITED STATES PATENT AND TRADEMARK OFFICE
CERTIFICATE OF CORRECTION

PATENT NO. : 4,558,930

DATED : December 17, 1985

INVENTOR(S) : Deedreek

It is certified that error appears in the above-identified patent and that said Letters Patent is hereby corrected as shown below:

Cover page, change Deedreek to --Harold C. Deedrick--.

*Signed and Sealed this*

*Third* Day of *June 1986*

[SEAL]

*Attest:*

DONALD J. QUIGG

*Attesting Officer*     *Commissioner of Patents and Trademarks*